(12) United States Patent
Van Schaack et al.

(10) Patent No.: US 9,058,067 B2
(45) Date of Patent: Jun. 16, 2015

(54) DIGITAL BOOKCLIP

(75) Inventors: Andy Van Schaack, Nashville, TN (US); Jim Marggraff, Lafayette, CA (US)

(73) Assignee: Livescribe, Oakland, CA (US)

( * ) Notice: Subject to any disclaimer, the term of this patent is extended or adjusted under 35 U.S.C. 154(b) by 1108 days.

(21) Appl. No.: 12/415,306

(22) Filed: Mar. 31, 2009

(65) Prior Publication Data
US 2009/0267923 A1 Oct. 29, 2009

Related U.S. Application Data

(60) Provisional application No. 61/042,196, filed on Apr. 3, 2008.

(51) Int. Cl.
*G06F 3/01* (2006.01)
*G06F 3/0354* (2013.01)
*G06F 3/03* (2006.01)
*G06F 3/0488* (2013.01)

(52) U.S. Cl.
CPC .......... *G06F 3/03545* (2013.01); *G06F 3/0317* (2013.01); *G06F 3/04883* (2013.01)

(58) Field of Classification Search
CPC .............. G06F 3/03545; G06F 3/0317; G06F 3/04883; G06F 3/0488
USPC ..................... 345/179, 156, 179.173; 382/229
See application file for complete search history.

(56) References Cited

U.S. PATENT DOCUMENTS

| | | | |
|---|---|---|---|
| 4,797,544 A * | 1/1989 | Montgomery et al. | 250/221 |
| 6,525,749 B1 * | 2/2003 | Moran et al. | 715/863 |
| 6,616,038 B1 * | 9/2003 | Olschafskie et al. | 235/454 |
| 6,752,317 B2 * | 6/2004 | Dymetman et al. | 235/462.45 |
| 7,175,095 B2 | 2/2007 | Pettersson et al. | |
| 7,176,896 B1 * | 2/2007 | Fahraeus et al. | 345/173 |
| 7,281,664 B1 | 10/2007 | Thaeler et al. | |
| 2004/0085301 A1 * | 5/2004 | Furukawa et al. | 345/179 |
| 2004/0229195 A1 | 11/2004 | Marggraff et al. | |
| 2005/0024346 A1 * | 2/2005 | Dupraz et al. | 345/179 |
| 2005/0243369 A1 | 11/2005 | Goldstein et al. | |
| 2006/0033725 A1 | 2/2006 | Marggraff et al. | |
| 2006/0043203 A1 * | 3/2006 | Floriach et al. | 235/494 |

(Continued)

FOREIGN PATENT DOCUMENTS

WO WO 2007/141204 A1 12/2007

OTHER PUBLICATIONS

PCT International Search Report and Written Opinion, PCT Application No. PCT/US2009/039217, May 18, 2009, 8 pages.

*Primary Examiner* — Kathy Wang-Hurst
*Assistant Examiner* — Jose Soto Lopez
(74) *Attorney, Agent, or Firm* — Fenwick & West LLP

(57) ABSTRACT

The described embodiments present a system and method for obtaining a portion of a digital document from a printed version of the document. Locations where a smart pen device interacts with a digital bookclip aligned relative the printed document are identified via coordinate sets. A digital document associated with the printed document and the coordinate sets from the smart pen device and digital bookclip are used to identify locations in the digital documents corresponding to locations in the printed document. Data from the identified locations in the digital documents is retrieved and presented to a user and can then be copied, saved, mailed electronically, and/or printed to a new paper document.

23 Claims, 8 Drawing Sheets

(56) References Cited

U.S. PATENT DOCUMENTS

| | | |
|---|---|---|
| 2006/0066591 A1 | 3/2006 | Marggraff et al. |
| 2006/0067576 A1 | 3/2006 | Marggraff et al. |
| 2006/0067577 A1 | 3/2006 | Marggraff et al. |
| 2006/0077184 A1 | 4/2006 | Marggraff et al. |
| 2006/0078866 A1 | 4/2006 | Marggraff et al. |
| 2006/0080608 A1 | 4/2006 | Marggraff et al. |
| 2006/0080609 A1 | 4/2006 | Marggraff et al. |
| 2006/0125805 A1 | 6/2006 | Marggraff et al. |
| 2006/0127872 A1 | 6/2006 | Marggraff et al. |
| 2006/0159421 A1* | 7/2006 | Sukeda et al. ............. 386/83 |
| 2006/0167754 A1 | 7/2006 | Carro et al. |
| 2006/0267965 A1 | 11/2006 | Clary |
| 2006/0292543 A1 | 12/2006 | Marggraff et al. |
| 2007/0055659 A1 | 3/2007 | Olschafskie et al. |
| 2007/0097100 A1 | 5/2007 | Marggraff et al. |
| 2007/0280627 A1 | 12/2007 | Marggraff et al. |
| 2008/0313172 A1* | 12/2008 | King et al. ............. 707/5 |

* cited by examiner

DIGITAL BOOKCLIP

CROSS REFERENCE TO RELATED APPLICATIONS

This application claims the benefit of U.S. Provisional Application No. 61/042,196, filed Apr. 3, 2008, which is incorporated by reference in its entirety.

BACKGROUND

This invention relates generally to pen-based computing systems, and more particularly to obtaining a digital representation of a region of a printed document.

In recent years, the digital documents have become more prevalent and more readily accessible. Digital documents allow highly efficient storage and sharing of documents or other data. However, many individuals still prefer to work with paper-based documents, which are inexpensive, highly portable and easy to annotate with edits and/or notes. To take advantage of the benefits of both digital documents and paper-based documents, many documents are often converted between paper and digital formats.

When paper documents are reviewed and/or edited, a reviewer commonly wants to generate a digital representation of selected portions of the paper document. Traditionally, the entire page of the paper document including the desired portions must be scanned into a digital format and digital editing tools must be used extract the desired portions from the digital representation of the entire page. This process can be time-consuming and require use of specialized hardware and/or software. Accordingly, an improved system for obtaining a digital representation of a user-selected region of a printed document is needed.

SUMMARY

The described embodiments present a system and method for obtaining a portion of a digital document from a printed version of the document. Locations where a smart pen device interacts with a digital bookclip aligned relative the printed document are identified via coordinate sets. In an embodiment, the digital bookclip includes a material imprinted with a pattern that allows the smart pen device to determine its position relative to the digital bookclip. A digital document associated with the printed document and the coordinate sets from the smart pen device and digital bookclip are used to identify locations in the digital documents corresponding to locations in the printed document. Data from the identified locations in the digital documents is retrieved and presented to a user and can then be copied, saved, mailed electronically, and/or printed to a new paper document. In an embodiment, the digital documents are obtained from a digital document database.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
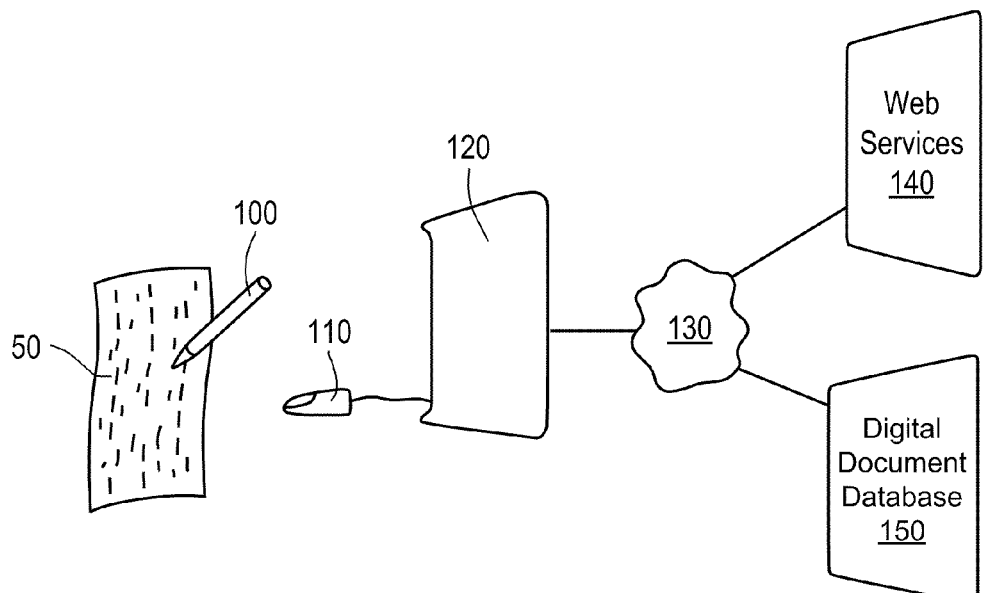
FIG. 1 is a schematic diagram of a pen-based computing system in accordance with an embodiment of the invention.

Embodiments of the invention may be implemented on various embodiments of a pen-based computing system, an example of which is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains, including electronic paper.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information, playing audio or responding in context to physical interaction such as tapping, tracing, or selecting other pre-existing visual information. In other embodiments, the smart pen 100 includes additional input modalities, such as motion sensing or gesture capture, and/or additional output modalities, such as vibrational feedback. By receiving different types of input, the smart pen 100 may simultaneously capture different types of data, such as audio, movement and/or written or text, which can be used to generate a session including different types of data.

Figure 2:
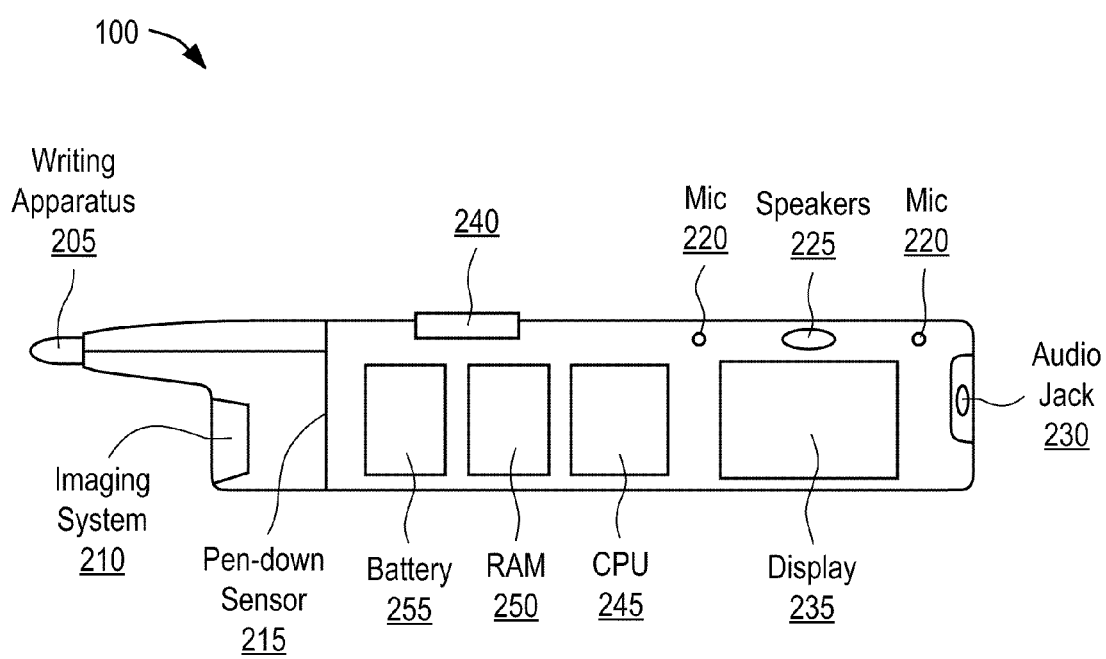
FIG. 2 is a diagram of a smart pen for use in the pen-based computing system in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system. For example a variety of types of switches including buttons, rocker panels, capacitive sensors, heat sensors, pressure sensors, biometric sensors or other sensing devices could be added.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50, entirely by the smart pen 100, or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sense movement of the smart pen 100 tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100, such as selected portions of a paper document for clipping, as further described below, may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

In an embodiment, a digital document database 150 communicates with the computing system 120 via the network 130. Alternatively, the web services 140 comprise a digital document database storing a collection of documents in a digital format or the computing system 120 locally includes the digital document database. Digital documents are indexed in the digital document database so that selected portions of each document can be retrieved. For example, each page of the originating paper document is saved as an image file in the digital document database and associated with a corresponding document identifier (e.g., an ISBN of a book) and page number. Text and graphics from the paper document can be meta-tagged and indexed in the database along with semantically appropriate entry and exit points. In one embodiment, all or a portion of the digital document database may be stored locally within the smart pen 100.

Based on information received from the smart pen 100, the computing system 120 finds a digital document associated with a printed document in the document database and retrieves a portion of the digital document associated with the clipped portion of the paper document identified by the smart pen 100. Alternatively the smart pen 100 retrieves the clipped portion of the paper document, or "clip," from a local memory. For example, the digital document database 150 includes a document identifier describing printed material and a digital representation of the printed material associated with the document identifier. The digital representation of the printed material associated with the document identifier is indexed by line and page number and associated with a coordinate index which correlates coordinates from the digital bookclip with line numbers or other locations in the digital representation of the printed material associated with the document identifier. Hence, the coordinate index identifies a line in the digital representation of the printed material associated with a coordinate on the digital bookclip 320 accessed by the smart pen 100. In one embodiment, the clip shows the selected region of the digital document without showing additional portions of the digital document. Alternatively, the clip includes the entire page of the digital document including the clip, with the clip highlighted.

The clip can then be digitally stored, sent by electronic mail, posted to a website, printed to a new paper document, or otherwise processed in the digital format by the computing system 120. For example, in one embodiment, a selected clip from a book can be sent by electronic mail as an image with a hyperlink to the book at an online book retailer and/or a button for purchasing the book. In another embodiment, the user can attach handwritten notes or metatags to the digital clip. In one embodiment, clipped portions of the document can be saved internally to the smart pen 100, which can then display the clipped text. Various example embodiments are described in more detail below in conjunction with FIGS. 3-5.

The smart pen 100 may communicate with the computing system 120 via any of a number of known communication mechanisms, including both wired and wireless communications, such as Bluetooth, WiFi, RF, infrared and ultrasonic sound. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also employ buttons, such as a power button or an audio recording button and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and/or gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use other appropriate means for achieving the same function. In an embodiment, data captured by the imaging system 210 is subsequently processed, allowing one or more content recognition algorithms, such as character recognition, to be applied to the received data.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until off-loaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100.

In an embodiment, the operating system and applications support a sequence of independent and/or concurrent input and output modalities and seamless transitions between these modalities to provide for language learning. For example, a language learning (LL) application running on an operating system supporting modality independence, concurrence and sequencing might begin a lesson announcing that today is a lesson in writing, reading, speaking and listening to Chinese. The smart pen 100 might then animate the creation of a Mandarin character, drawing strokes of the character in proper order on the display 235, while simultaneously announcing the character's pronunciation via the speaker 225. The operating system would enable the simultaneous display and synchronized delivery of audio. The LL application might then prompt the user to draw each stroke of the character, following the animated display of each stroke on the display 225, thus sequencing the transition between modalities of visual output of information displayed on the smart pen 100, in a synchronized manner, with the input of stroke data by a user. As the user becomes more fluent with the creations of the character, and begins writing more rapidly, perhaps writing ahead of the strokes displayed, the OS will enable real time capture and interpretation of strokes and respond with proper displaying and audio as appropriate, engaging the user in a multimodal dialogue. As the user demonstrates proficiency in writing, and the smart pen 100 begins to be lead by the user, displaying strokes in response, rather than leading with strokes, the smart pen 100 might verbally compliment the user and request the user to speak the sound for the character during or after the stroke writing. As the user speaks the character sound, the smart pen 100 could record the sound and compare it to an exemplar. The smart pen 100 might then prompt the user by playing back the exemplar pronunciation and the user pronunciation, providing commentary and/or visual guidance regarding correctness in pronunciation The smart pen 100 might then prompt the user to listen, write, and speak, announcing a series of words one by one, waiting for the user to write and speak the words, while comparing the input speech and writing to exemplars, and redirecting the user to repeat writing or speaking as necessary.

In an extension of this example, the smart pen 100 might prompt the user to interact with a pre-printed Language Learning text or workbook. The smart pen 100 might move the user's attention among multiple displays, from text, to the workbook, to a user's notebook, while continuing a dialogue involving the smart pen 100 speaking and displaying independently or concurrently, directing the user to speak, write, and look at information independently or concurrently. Various other combinations of input modalities and output modalities, and sequencing, are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword or a physical motion, may indicate that subsequent input is associated with one or more application commands. Input with a spatial and/or temporal component may also be used to indicate that subsequent data. Examples of input with a spatial input include two dots side-by-side. Examples of input with a temporal component include two dots written one immediately after the other. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Digital Clipping with Digital Bookclip and Smart Pen

In a first embodiment, a "digital bookclip" 320 is used together with the smart pen 100 to identify regions of a digital document using a printed version of the document. The digital bookclip 320 is a strip of encoded dot paper with a dot pattern as described above in conjunction with FIG. 1. The dot pattern on the digital bookclip 320 can be read and interpreted using the smart pen 100 to obtain a set of coordinates defining a location on the encoded dot paper. Although interaction with the digital bookclip 320 is described with respect to a smart pen 100, in other embodiments another digital clipping device, such as a stylus or other device which identifies coordinates from the digital bookclip 320 identifying a location.

Figure 3:
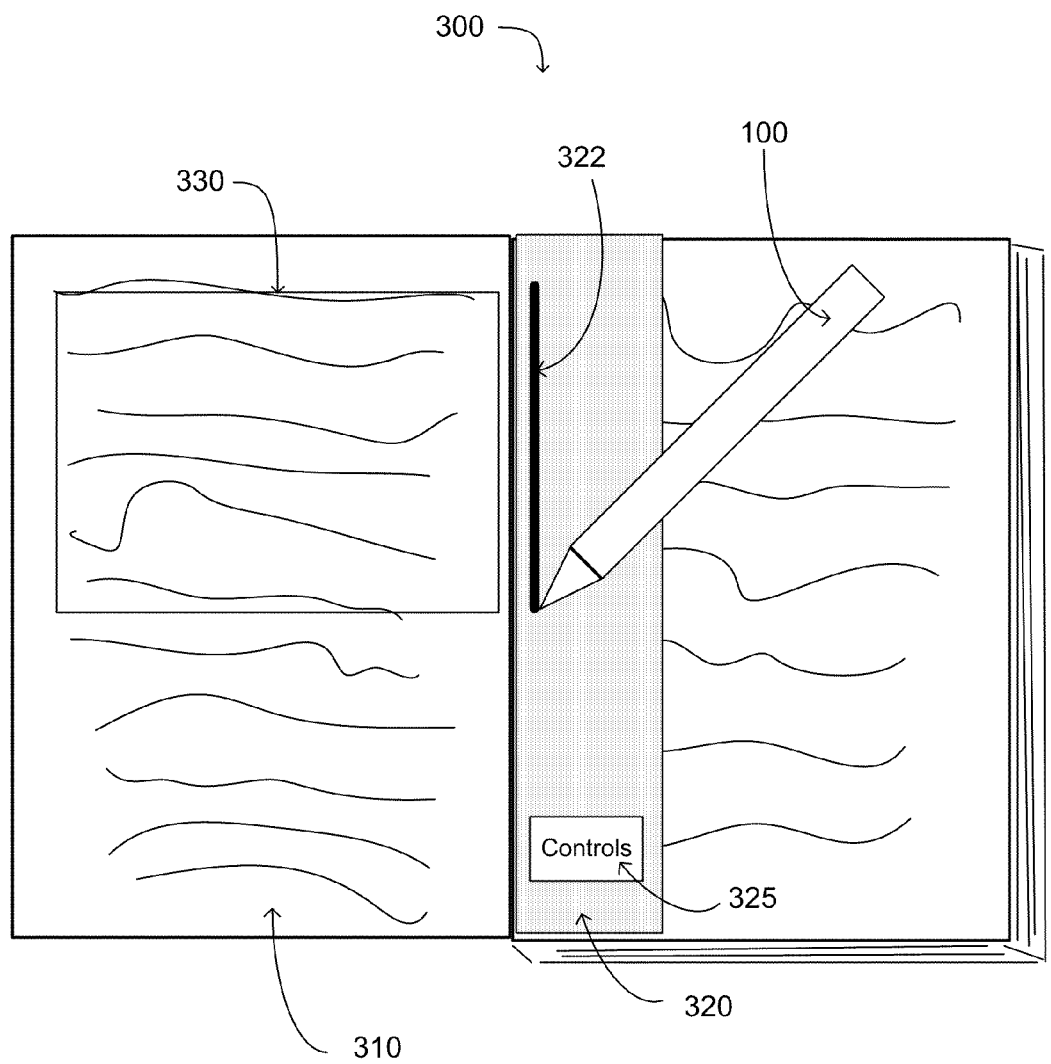
FIG. 3 is a diagram of a system including a digital bookclip identifying regions of a digital document from a corresponding paper document in accordance with an embodiment of the invention.

In an embodiment, the digital bookclip 320 also includes a control region 325 accessible by the smart pen 100 to initiate one or more actions. An example system 300 using a digital bookclip 320, in accordance with an embodiment of the invention, is illustrated in FIG. 3. In the system 300, a region of a printed book 310 is selected by placing the digital bookclip 320 in a predetermined position relative to the page of interest. For example, a mark on the digital bookclip 320 is aligned with the top of the page. The smart pen 100 is then used to identify the coordinates of the selected region of a page in the book 310 by accessing the digital bookclip 320. For example, the smart pen 100 is used to draw a vertical line 322 on the digital bookclip 320 where the beginning and end of the vertical line 322 are horizontally aligned with the beginning and the end of the selected region 330 to be clipped. The smart pen 100 captures the coordinates indicating the selected region 330 from the digital bookclip 320 using the dot pattern included on the digital bookclip 320 and transfers the coordinates to computing system 120. The computing system 120 then finds the corresponding digital region of the book 310 in a digital document database 150. In an embodiment, the digital document database 150 includes a document identifier describing printed material and a digital representation of the printed material associated with the document identifier. The digital representation of the printed material associated with the document identifier may be indexed by line and page number, allowing access to specific lines of the digital representation of the printed material associated with the document identifier. The digital document database 150 also associates a coordinate index with each document identifier, associating coordinates from the digital bookclip with line numbers or other locations in the digital representation of the printed material associated with the document identifier. Thus, the coordinate index identifies a line in the digital representation of the printed material associated with a coordinate on the digital bookclip 320 accessed by the smart pen 100. The digital representation of the selected region 330 can then be stored, sent via electronic mail, printed to a new document, or otherwise manipulated in a digital format.

Figure 4A:
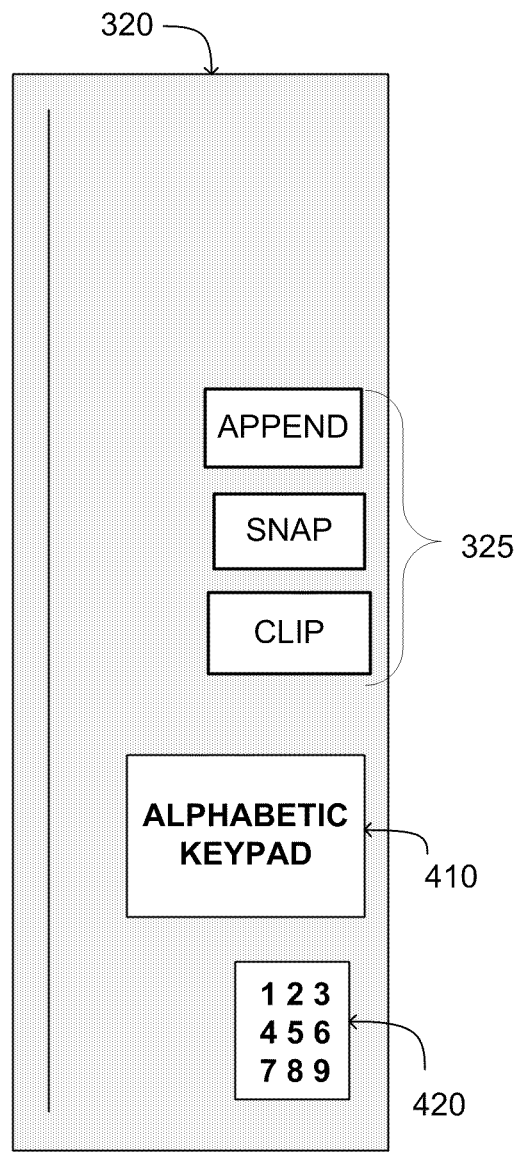
FIG. 4A is a diagram of a digital bookclip in accordance with an embodiment of the invention.
Figure 4B:
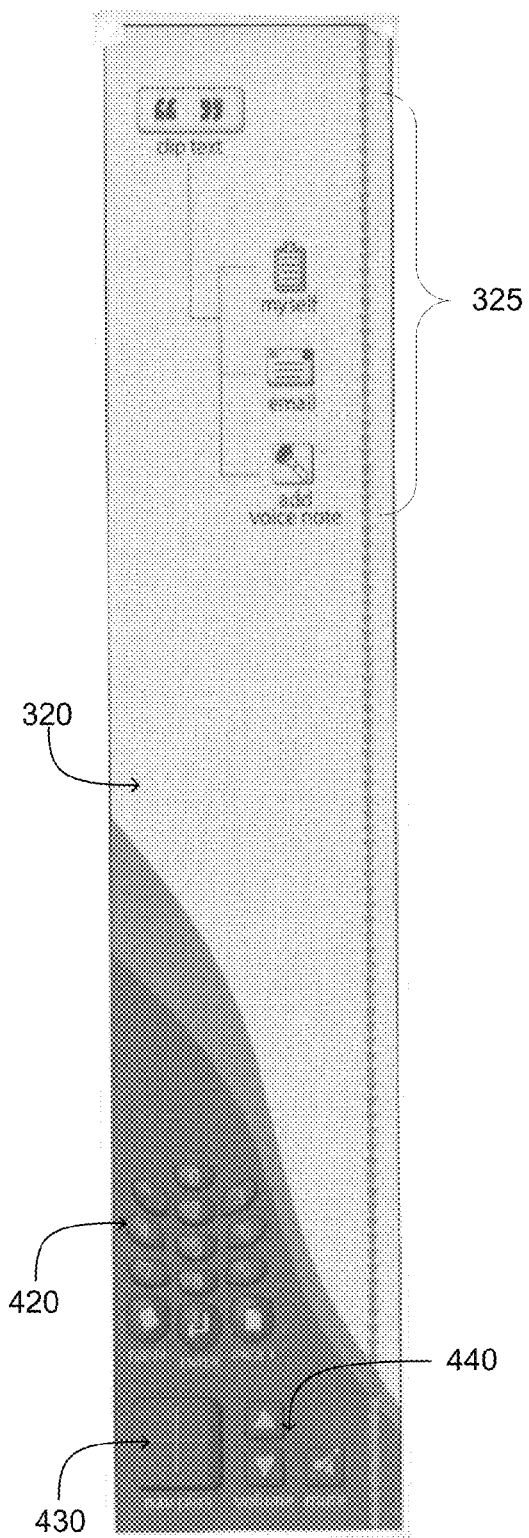
FIG. 4B is a diagram of an additional example of a digital bookclip in accordance with an embodiment of the invention.
Figure 4C:
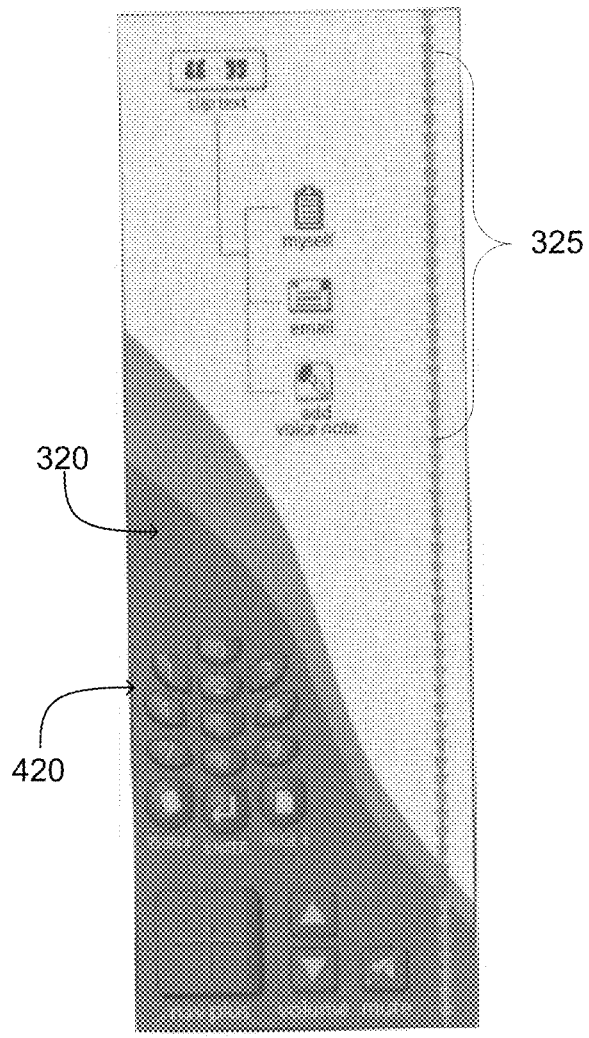
FIG. 4C is a diagram of another example of a digital bookclip in accordance with an embodiment of the invention.
Figure 4D:
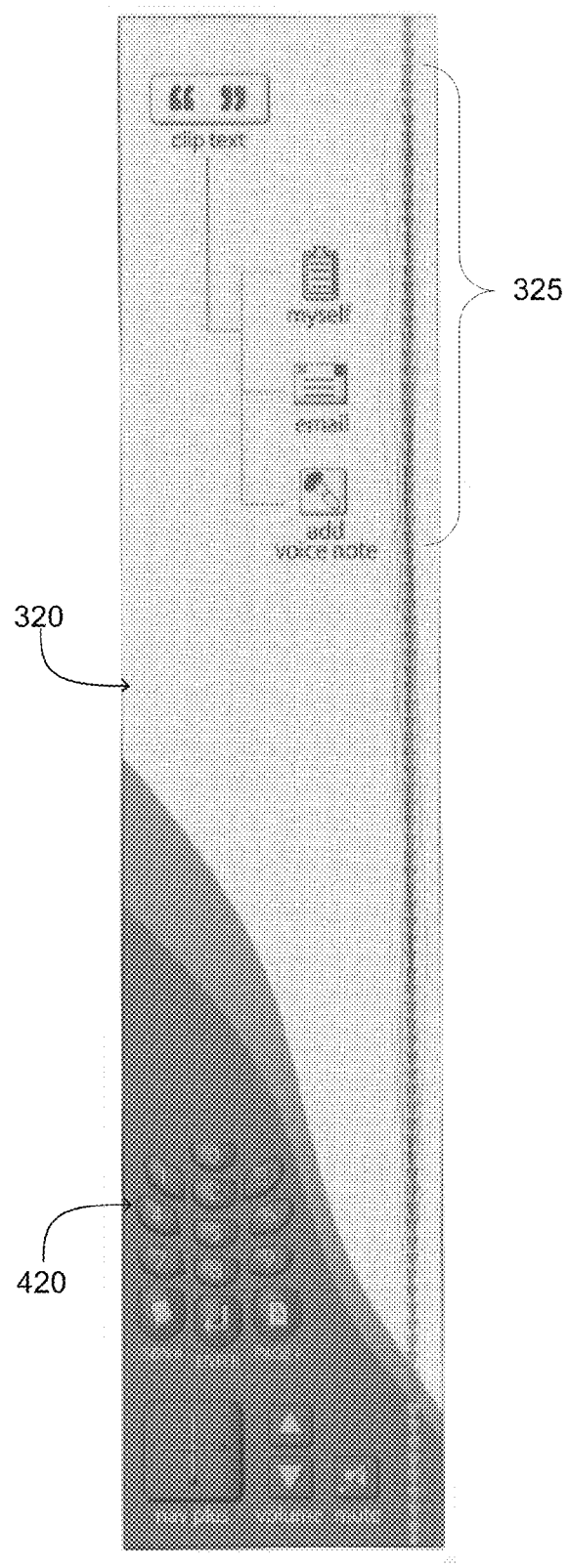
FIG. 4D is a diagram of an alternate digital bookclip in accordance with an embodiment of the invention.
Figure 5:
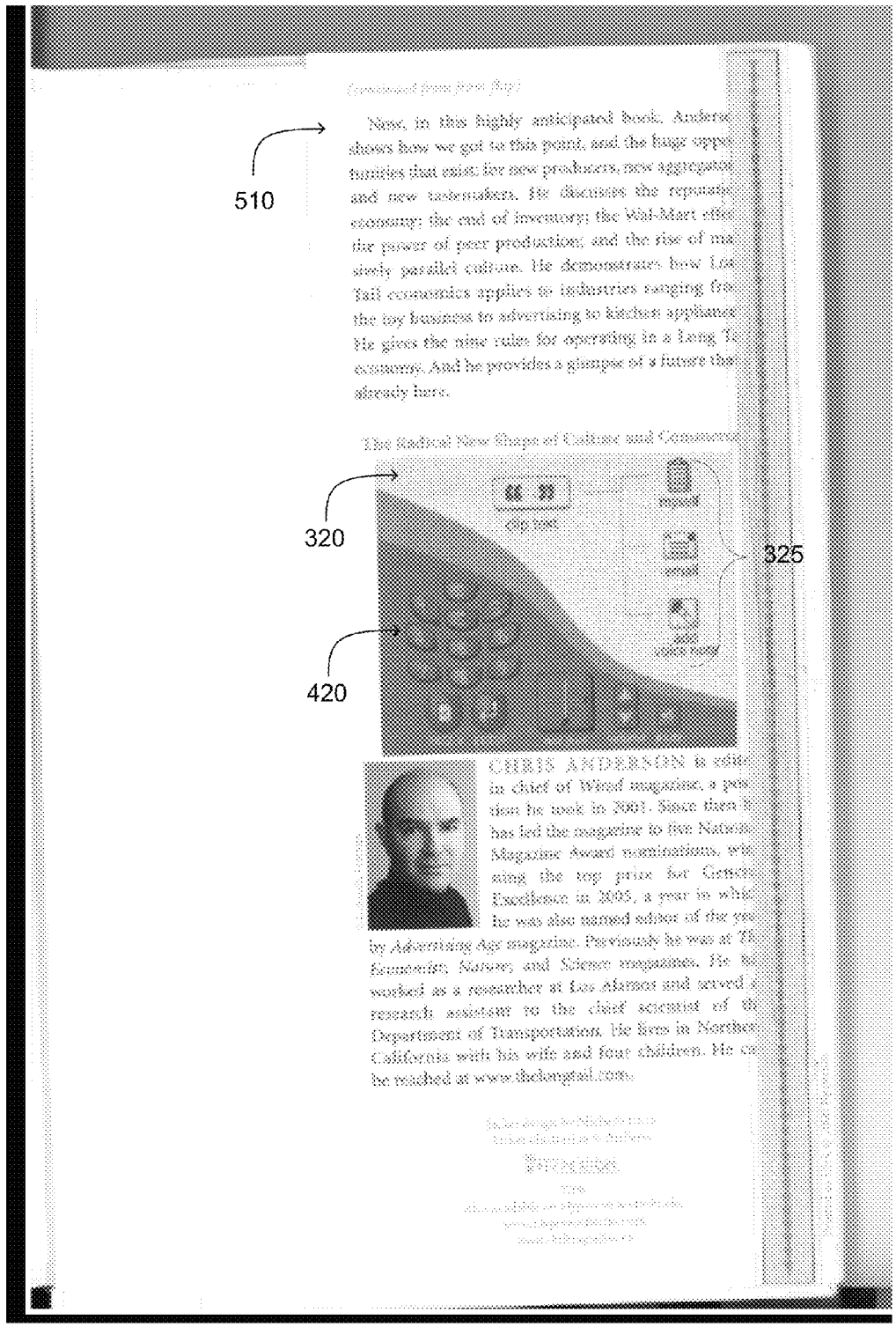
FIG. 5 is a diagram of a digital bookclip included in a dust jacket of a printed book in accordance with an embodiment of the invention.

FIG. 4A illustrates an example embodiment of the digital bookclip 320. In one embodiment, the digital bookclip 320 is approximately one inch wide by nine inches long and has a form factor similar to that of a traditional bookmark. Additional embodiments of the digital bookclip are illustrated in FIGS. 4C-4D, which illustrate that the length and width of the digital bookclip 320 may be modified in different embodiments. In another embodiment, the digital bookclip is printed on an inner flap of a book dust jacket and can be folded over onto a page of interest. FIG. 5 illustrates an example embodiment of a digital bookclip incorporated with a book dust jacket 510. The digital bookclip can include various controls accessible using the smart pen. Examples of controls may include a numeric keypad 420, an alphabetic keypad 410, and a control region 325 including one or more predefined controls, such as an "append" button, a "snap" button, and a "clip" button. Controls within the control region 325 may be selected by tapping on the desired control with the smart pen. For example, to access the "clip" button shown in FIG. 3, the portion of the control region 325 associated with the "clip" button is tapped by the smart pen 100.

As shown in FIG. 4A, the control region 325 includes one or more controls, examples of which are the "append" button, the "snap" button and the "clip" button shown in FIG. 4A. The "append" button allows a user to select non-contiguous regions of a document. For example, the user presses the "append" button with the smart pen 100 to indicate that the presently selected region should be appended to a previously selected region in the digital document. Accessing the "snap" button with the smart pen 100 causes a selected region to "snap" to a semantically significant entry or exit point. For example, the selected region may be modified so that is included in the digital document at so that the selected region starts and ends at the beginning and ending of a sentence or a paragraph. The "clip" button causes selection of an entire page when accessed by the smart pen 100. In one embodiment, the digital bookclip 320 can be rotated and aligned horizontally. The user can then draw a horizontal line corresponding to the left and right boundaries of the clip to select a region of the paper document. The selected region of the paper document is snapped to semantically meaningful borders of the printed document, such as the beginning of a sentence or paragraph.

Alternative embodiments of the digital bookclip 320 may include additional or different sets of controls. FIGS. 4B-4D show examples of additional controls that may be included in different embodiments of the digital bookclip 320. For example, FIGS. 4B-4D show embodiments of the digital bookclip 320 which include a navigation region 430 and one or more audio controls 440. In an embodiment, the navigation region 430 allows navigation through data, such as menus, stored on the smart pen 100 by interaction with the navigation region 430. The audio controls 440 allow playback volume of audio data by the speakers 225 or by the computing device 120 to be controlled from the digital bookclip 320.

The numeric keypad 420 and alphabetic keypad 410 allow the user to enter alphabetic or numeric characters as inputs for various functions using the smart pen 100 and the digital bookclip 320. Alternatively, the user can input alphabetic or numeric characters by writing the characters on a region of the digital bookclip 320. The handwritten characters are then captured by the imaging system 210 and recognized by the smart pen 100 using character recognition software.

Figure 6:
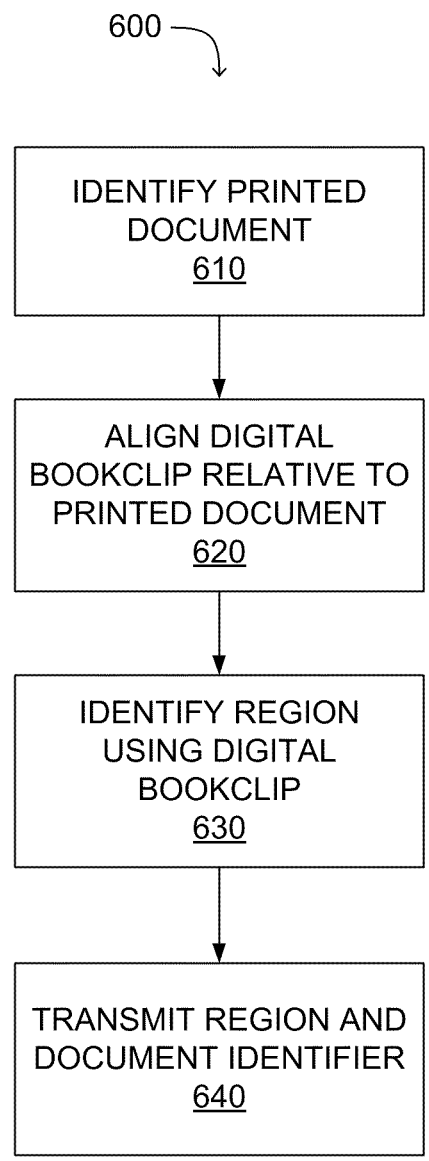
FIG. 6 is a flow chart of a method for identifying regions of a digital document corresponding to a paper document in accordance with an embodiment of the invention.

FIG. 6 shows an embodiment of a method 600 for selecting a region of a paper document, such as a book, using digital bookclip 320.

The printed document is initially identified 610. For example, a document identifier, such as the ISBN number of a book is entered the numeric keypad 420 of the digital bookclip 320. Alternatively, the document identifier is written on the digital bookclip and captured by the imaging system 210 of the smart pen 100, or the document identifier is scanned and captured by the imaging system 210. If the document has multiple pages, the document identifier user may also identify a specific page number in the printed document.

The digital bookclip 320 is then aligned relative to the printed document. For example, the digital bookclip is aligned with the top or bottom of the printed document. The smart pen 100 and digital bookclip 320 are used to identify 630 a region of the printed document to be clipped. In one embodiment, a user draws a vertical line on the digital bookmark 320 using the smart pen 100 so that the beginning and end of the line are horizontally aligned with the beginning and the end of the region to be clipped. The identified region and document identifier are transmitted 640 to a computing system 120. In one embodiment, the smart pen 100 is docked to a docking station 110 coupled to the computing system 120 to transmit 640 data identifying the region to be clipped and/or the printed document to the computing system 120. Alternatively, the smart pen 100 wirelessly communicates with the computing system 120 to transmit 640 data.

The computing system 120 retrieves the identified document from a digital document database and uses the information received from the smart pen to acquire the region to be clipped from the digital document. Alternatively, the digital document is stored directly in the smart pen 100, which processes the digital document to acquire the region to be clipped. The smart pen 100 then transmits 640 the region to be clipped to the computing system 120. In another embodiment, the smart pen 100 transmits 640 a wireless signal to initiate a particular function such as digitally storing the region to be clipped, sending the region to be clipped by electronic mail, posting the region to be clipped to a website or another suitable action.

Digital Clipping with Smart Pen

In an alternative embodiment, portions of a printed document can be clipped without using the digital bookclip 320. Instead, portions of the printed document are identified using the imaging system 210 of the smart pen 100. In this embodiment, the imaging system 210 captures a region including of images and/or text from the printed document and matches the selected region with the contents of a digital document database to identify a digital region corresponding to the selected region. For example, if the user drags the smart pen 100 vertically down several sentences of text, the imaging system 210 captures a letter, or set of letters, when the smart pen 100 intersects each line (e.g., f, tr, an, 4, vi). If enough characters are captured to provide a unique sequence, the character sequence is be matched against a digital document corresponding to the printed document locate the selected region in the digital document. The full-text and images of a portion of the digital document corresponding to the selected portion is then retrieved.

An example method for selecting a portion of a printed document using the smart pen 100 is now described. The user first identifies the printed document (e.g., by scanning, typing, or writing an identifier code). A page of interest in the printed document is selected and identified by a user. The beginning of the region to be clipped from the printed document is then touched with the smart pen 100 and vertical line is drawn to the end of the selected region using the smart pen 100. The smart pen 100 captures a character sequence using the vertical stacking of letters captured from each line of text in the selected region letters and communicates the character sequence to a computing system 120 which uses the character sequence to retrieve a digital document corresponding to the printed document from a digital document database by matching the character sequences to a character sequence in a digital document. The user can then use the acquired portion of the digital document in a variety of ways. For example, the portion of the digital document is sent via email, uploaded to a website, accessed for editing or saved to a storage device.

Digital Bookclipping with Patterned Paper

In another embodiment, a portion of a printed document is selected using printed material printed with, or overprinted with, a dot pattern. In this embodiment, a user first invokes a "clipping application" of the smart pen 100. The smart pen 100 is then used to select regions of text or images by, for example, circling the area of interest, drawing a vertical line in the margin next to the region of interest, drawing "L" shaped brackets in opposing corners of a rectangular selection area, or various other identifiable annotations for selecting a region. The dot pattern allows the smart pen 100 to recognize recognizes its location on the patterned paper. This location information identifies the corresponding portions of a digital document from the digital document database. In one embodiment, the user further adds notes or other annotations to the printed document using the smart pen 100. The notes and annotations are then added to the identified portion of the digital document acquired from the digital document database.

In one embodiment, the user identifies a portion by selecting an index point or other graphical representation of the printed document pointing to related data. For example, a user may circles a chapter heading in the printed document to select all the text within that chapter. Similarly, a user may select a map region to clip all the information in the document related to the selected map region.

Digital Bookclipping for Interactive Documents

In one embodiment, the digital bookclipping methods described above can be used to create an "interactive document." An interactive document includes text and/or images printed using an encoded dot pattern which also creates selectable regions associated with digital content. For example, a paper document may include a reference to digital data such as an audio file, a video file, hand written annotations by the user or others or other digital content. When the reference is included in a selected region, the additional digital data is returned along with a digital representation of the text and/or images associated with the paper document.

Once a region is selected, the user may save the content associated with the selected region to an internal scrapbook, post the content to a website, send the content to a friend, paste the content into another document, or manipulate the content using another application. For example, selected text can be processed with a text to speech application and the speech outputted through a speaker. As another example, selected text may be translated to another language.

In one embodiment, an author associated with the interactive document determines the digital content associated with different regions of the interactive document. The author may supply the digital content to the user together with the printed document. When a user selects an interactive region, digital content associated with the selected region is retrieved from the digital document database. For example, a user may select a region on the printed document associated with an audio file using the smart pen 100, which communicates with a computing system 100 to retrieve and play the audio file. Alternatively, digital content associated with one or more regions of the interactive document can be stored directly to a memory of the smart pen 100.

In another embodiment, the author of the printed content using a dot pattern to generate the printed content and allows third party developers to associate interactive digital data sets with the printed content. For example, a publishing company prints a dictionary on patterned paper and does not develop any interactive applications for the dictionary; however, the publishing company allows third party developers to add interactive content to the dictionary. To allow content addition by third party developers, the publishing company may release information specifying patterned regions represented on each page of the dictionary and grant the third party developers permission to create applications using those regions. For example, one third party developer may provide a digital data set to create a talking dictionary by associating audio content with selectable regions of the printed dictionary, allowing a user to select a word and retrieve an audio file of the word being spoken. Another third party could create a foreign language translation of the same dictionary using an application that provides translations of selected content. Yet another third party might create a thesaurus that provides a related word when the user taps on a word in the dictionary with a smart pen 100.

The digital content can be stored to an onboard memory 250 of the smart pen 100, or to a computing system 120 communicatively coupled to the smart pen 100. When a user taps on specific region on a printed page (e.g. an icon printed on the page), the smart pen 100 determines whether the onboard memory 250 includes any digital content related to the selected region. If one or more datasets are associated with the selected region, interactive content is available to the user. If multiple datasets are available, the user may be prompted to select from a listing of datasets to use. For example, the user might purchase a dictionary along with both an audio data set and a thesaurus data set associated with regions of the dictionary. When the user taps the smart pen 100 on the page of the dictionary, the user is prompted to select which mode to use (e.g., audio mode or thesaurus mode). In one embodiment, the display 235 allows the smart pen 100 to visually prompt the user to select a data set. Alternatively, an audio prompt is presented to the user via the speakers 225 to select a data set.

In another example embodiment, a map company could print and distribute high quality maps on paper printed with a dot pattern. Third party developers can then provide various types of datasets to add interactive features to the maps. Note that the publication of the printed material is decoupled from the development of the interactive content associated with that printed material.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A pen-based computing system for digitally capturing content from a printed document comprising one or more pages of printed data, the printed document associated with a document identifier, the system comprising:
    a digital bookclip comprising a physical material encoded with a pattern, the physical material distinct from the printed document;
    a smart pen device comprising:
        an imaging system configured to capture an interaction of the smart pen device with the digital bookclip by reading the encoded pattern of the digital bookclip, the smart pen device capturing a beginning location on the digital bookclip corresponding to a beginning of the interaction and an end location on the digital bookclip corresponding to an end of the interaction;
    a database storing a digital representation of the printed document; and
    a memory storing computer program code configured to be executed by a processor coupled to the smart pen device, the computer program code including instructions for:
        accessing the digital representation of the printed document from the database using the document identifier,
        determining a vertical or horizontal orientation of the digital bookclip with respect to the printed document;
        receiving the captured beginning and end locations corresponding to the interaction of the smart pen with the digital bookclip;
        identifying a selected first portion of the digital representation of the printed document based on the determined orientation of the digital bookclip with respect to the printed document and the beginning location and the end location of the digital bookclip captured when the digital bookclip is aligned with the printed document; and retrieving the portion of the digital representation of the printed document.

2. The pen-based computing system of claim 1, wherein retrieving the portion of the digital representation of the printed document corresponding to the selection by the smart pen device comprises: transmitting the portion of the digital representation to a device, printing the portion of the digital representation, or emailing the portion of the digital representation to an email address.

3. The pen-based computing system of claim 1, wherein the digital bookclip further comprises a control region, wherein the smart pen communicates its location on the digital bookclip to the processor responsive to the smart pen device interacting with the control region.

4. The pen-based computing system of claim 1, wherein the digital bookclip further comprises a numeric keypad, wherein the document identifier is identified responsive to an interaction of the smart pen with the numeric keypad.

5. The pen-based computing system of claim 1, wherein the digital bookclip is aligned to a page of the printed document.

6. The pen-based computing system of claim 1, wherein the digital bookclip being aligned to the printed document comprises:

manually aligning a vertical dimension of the digital bookclip with a vertical dimension of the page and manually aligning a horizontal position of the digital bookclip aligned with a specified position on the page.

7. The pen-based computing system of claim 6, wherein the specified position on the page comprises a corner of the page.

8. The pen-based computing system of claim 1, wherein the digital bookclip is a physically separate object from the printed document.

9. The system of claim 1, wherein the physical material is opaque.

10. The system of claim 1, wherein:

the smart pen device comprises a display system configured to display a first notice response to the smart pen device capturing the beginning location on the digital bookclip and a second notice responsive to the smart pen device capturing the end location on the digital bookclip; and the computer program code additionally includes instructions for displaying at least a sub-portion of the digital representation of the printed document using the display system.

11. The system of claim 1, wherein identifying a selected portion of the digital representation of the printed document based comprises:

identifying a beginning of a sentence corresponding to the beginning location captured on the digital bookclip and identifying an ending of a sentence corresponding to the end location captured on the digital bookclip; and selecting the portion of the digital representation between the identified beginning of the sentence and the identified end of the sentence.

12. The system of claim 1, comprising:

selecting an append button;

capturing a second beginning location on the digital bookclip corresponding to a beginning of a second interaction with the digital bookclip and a second end location on the digital bookclip corresponding to an end of the second interaction with the digital bookclip;

identifying a second portion of the digital document based on the second beginning location and the second end location of the second interaction; and appending the second portion of the digital document to the selected first portion of the digital document.

13. A method for digitally capturing content from a printed document comprising one or more pages of printed data, the printed document associated with a document identifier, and a page of the printed document aligned with a digital bookclip in a predetermined manner, the method comprising:

receiving the document identifier associated with the printed document;

determining a vertical or horizontal orientation of the digital bookclip with respect to the printed document, wherein the digital bookclip comprises a physical material encoded with a pattern, the physical material distinct from the printed document;

using an imaging system of a data clipping device, capturing a beginning location on the digital bookclip corresponding to a beginning of an interaction with the data clipping device and an end location on the digital bookclip corresponding to an end of the interaction with the data clipping device;

identifying a selected portion of the page of the printed document based on the determined orientation of the digital bookclip with respect to the printed document and the beginning location and the end location of the interaction captured when the digital bookclip is aligned with the page of the printed document;

communicating the selected portion of the page of the printed document and the document identifier to a digital document retrieval system, that is configured to located a digital document associated with the document identifier and retrieve a portion of the digital document associated with the portion of the page of the printed document; and receiving from the digital document retrieval system the portion of the digital document associated with the portion of the page of the printed document.

14. The method of claim 13, wherein a vertical dimension of the digital bookclip is aligned with a vertical dimension of the page; and wherein a horizontal position of the digital bookclip is aligned with a specified position on the page.

15. The method of claim 14, wherein the horizontal position on the page comprises a corner of the page.

16. The method of claim 13, wherein the digital bookclips a physically separate object from the printed document.

17. The method of claim 13, wherein the data clipping device comprises a smart pen device.

18. A method for obtaining a digital representation of a region of a printed document including one or more pages, the method comprising:

receiving a document identifier associated with the printed document;

capturing, by an image sensor of a smart pen, a sequence of characters during a single vertical gesture of the smart pen, the single vertical gesture of the smart pen intersecting a plurality of horizontally oriented text on the printed document, the sequence of characters below and within view of the smart pen device during the single vertical gesture;

using optical character recognition to identify the sequence of characters captured during the single vertical gesture;

retrieving a digital document associated with the document identifier;

comparing the sequence of characters captured during the single vertical gesture with data included in the digital document; and responsive to finding a sequence of characters in the data of the digital document matching the sequence of characters captured during the single vertical gesture, retrieving a portion of the digital document corresponding to the plurality of lines of horizontally oriented text data on the printed document.

19. The method of claim 18 wherein the single vertical gesture of the smart pen device comprises a vertical drag.

20. The method of claim 18 wherein comparing the sequence of characters captured during the single vertical gesture comprises:

generating one or more sequences of characters from data included in the digital document; and comparing the sequence of characters captured during the single vertical gesture with the one or more sequences of characters from data included in the digital document.

21. A non-transitory computer-readable storage medium storing instructions configured to be executed by a processor coupled to a smart pen device, the instructions for digitally capturing content from a printed document comprising one or more pages of printed data, the printed document associated with a document identifier, the instructions including instructions for:

receiving the document identifier associated with the printed document;

determining a vertical or horizontal orientation of a digital bookclip with respect to the printed document, wherein the digital bookclip comprises a physical material encoded with a pattern, the physical material distinct from the printed document;

identifying a selected portion of a page of the printed document based on the determined orientation of the digital bookclip and a beginning location and an end location of an interaction of a data clipping device with the digital bookclip captured when the digital bookclip is aligned with the page of the printed document;

transmitting the selected portion of the page and the document identifier to a digital document store for locating a digital document associated with the document identifier.

22. The non-transitory computer readable storage medium of claim 21, wherein identifying the portion of the page of the printed document associated with the selection received from the data clipping device comprises:

determining a paper coordinate system associated with the digital bookclip;

determining a coordinate set associated with a location on the digital bookclip accessed by the data clipping device; and identifying the coordinate set associated with the location on the digital bookclip accessed by the data clipping device in the digital coordinate system.

23. The non-transitory computer readable storage medium of claim 21, wherein retrieving the portion of the digital document associated with the portion of the page of the printed document comprises:

identifying a coordinate set associated with the selection of the one or more locations, the coordinate set specifying a relative position of the selection of the one or more locations on the digital bookclip;

identifying a line number included in the digital document associated with the document identifier associated with the coordinate set associated with the selection of the one or more locations, the line number identifying a line of text in the digital document; and retrieving the line of text in the digital document.

* * * * *